(12) United States Patent
Kusaka et al.

(10) Patent No.: US 7,210,850 B2
(45) Date of Patent: May 1, 2007

(54) HYDRODYNAMIC BEARING DEVICE, SPINDLE MOTOR AND HARD DISK DRIVING APPARATUS HAVING THE HYDRODYNAMIC BEARING DEVICE

(75) Inventors: Keigo Kusaka, Ozu (JP); Takafumi Asada, Hirakata (JP); Koichi Fujimoto, Ozu (JP); Hisaaki Yano, Ozu (JP)

(73) Assignee: Matsushita Electric Industrial Col, Ltd., Osaka (JP)

( * ) Notice: Subject to any disclaimer, the term of this patent is extended or adjusted under 35 U.S.C. 154(b) by 154 days.

(21) Appl. No.: 11/183,745

(22) Filed: Jul. 19, 2005

(65) Prior Publication Data

US 2006/0018576 A1    Jan. 26, 2006

(30) Foreign Application Priority Data

Jul. 21, 2004    (JP)    ............... 2004-213549

(51) Int. Cl.
*F16C 32/06*    (2006.01)

(52) U.S. Cl. ....................... 384/107; 384/113

(58) Field of Classification Search ................ 384/100, 384/107, 112, 113
See application file for complete search history.

(56) References Cited

U.S. PATENT DOCUMENTS 4,557,610 A    12/1985    Asada et al.

5,715,116 A *    2/1998    Moritan et al. ............. 384/107
6,939,046 B2 *    9/2005    Oelsch ........................ 384/100
6,948,852 B2 *    9/2005    Oelsch ........................ 384/100
7,025,505 B2 *    4/2006    Komori et al. ............. 384/107

FOREIGN PATENT DOCUMENTS

| EP | 0 117 873 | 9/1984 |
| JP | 58-24616 | 2/1983 |
| JP | 59-43216 | 3/1984 |
| JP | 2509752 | 4/1996 |
| JP | 8-186952 | 7/1996 |
| JP | 8-331796 | 12/1996 |

* cited by examiner

*Primary Examiner*—Thomas R. Hannon
(74) *Attorney, Agent, or Firm*—Wenderoth, Lind & Ponack, L.L.P.

(57) ABSTRACT

A hydrodynamic bearing device includes a sleeve having a bearing bore substantially at a center portion, a shaft inserted in the bearing bore in a rotatable manner, a thrust plate for supporting an end of the shaft in the thrust direction and an upper retaining portion that has an opening portion through which the shaft passes and covers the upper surface of the sleeve. A radial hydrodynamic bearing is formed between the bearing bore of the sleeve and the shaft, while a thrust hydrodynamic bearing is formed between the thrust plate and an end of the shaft. A first space is formed between the upper surface of the sleeve and the upper retaining portion. A second space is formed between the upper retaining portion and a step portion.

22 Claims, 8 Drawing Sheets

HYDRODYNAMIC BEARING DEVICE, SPINDLE MOTOR AND HARD DISK DRIVING APPARATUS HAVING THE HYDRODYNAMIC BEARING DEVICE

CROSS-REFERENCE TO RELATED APPLICATIONS

This application claims priority under 35 U.S.C. § 119 to Japanese Patent Application No. 2004-213549 The entire disclosure of Japanese Patent Application No. 2004-213549 is hereby incorporated herein by reference.

BACKGROUND OF THE INVENTION

1. Field of the Invention

The present invention relates to a hydrodynamic bearing device, a spindle motor and a hard disk driving apparatus having the hydrodynamic bearing device.

2. Description of the Prior Art

In recent years, recording apparatuses that utilize a rotating record medium such as an optical disk or a magnetic disk have been developed with larger memory capacity and higher data transfer rate. For this reason, disk driving apparatuses are required to rotate at a high speed with low NRRO (nonsynchronous run-out) and little rotation noise. Therefore, a hydrodynamic bearing device is used for the bearing.

In the hydrodynamic bearing device, oil, as a lubricant, exists between a shaft and a sleeve. A pumping pressure generated by a dynamic pressure generating groove due to rotation keeps the shaft in the state of noncontact with the sleeve. Since the shaft does not contact the sleeve in the hydrodynamic bearing device, the shaft has a high durability and is suitable for high-speed rotation due to a very small frictional resistance.

With reference to FIG. 9, a typical example of the conventional hydrodynamic bearing device will be described below. FIG. 9 is a cross sectional view of a hard disk driving apparatus including a conventional hydrodynamic bearing device.

As shown in FIG. 9, a shaft 401 is inserted in a bearing bore 402A of a sleeve 402 in a rotatable manner. The sleeve 402 is fixed to a base 405. The shaft 401 has a flange 403 that is formed integrally with a lower end portion of the shaft 401. The flange 403 is housed in a step portion 402D that is formed at a lower portion of the sleeve 402. The flange 403 is rotatable facing a thrust plate 404. Since the flange 403 is housed in the step portion 402D, the flange 403 works as a stopper for preventing the shaft 401 from dropping out of the sleeve 402. A lower end portion of the sleeve 402 has a lower retaining portion 402B that is processed to be like a thin cylinder, which encloses the thrust plate 404 so that the thrust plate 404 is fixed to the sleeve 402 by bending (deformed) the whole of a rim of the lower retaining portion 402B inwardly and by using adhesive.

An inner face of the bearing bore 402A is provided with dynamic pressure generating grooves 402E and 402F having a herringbone shape that is known in the technology. In addition, a face of the sleeve 402 of the flange 403 that is opposed to the step portion 402D is provided with a dynamic pressure generating groove 403A, while the face of the flange 403 that is opposed to the thrust plate 404 is provided with a dynamic pressure generating groove 403B. The gap between the shaft 401 and the flange 403 including the dynamic pressure generating grooves 402E, 402F, 403A and 403B is filled with oil 412 that is an operating fluid. There is an oil reservoir 402C between the dynamic pressure generating grooves 402E and 402F on the inner face of the bearing bore 402A. The oil 412 is stored in the oil reservoir 402C.

The shaft 401 is provided with a hub 406 for retaining a rotor magnet 407. A clamper 411 is fixed to the hub 406 by screwing an external thread 413 into an internal thread (not shown) that is provided in the shaft 401. The base 405 is provided with a stator 408 that is disposed at a position opposed to the rotor magnet 407. A disk 409, which is a medium that is used for recording and/or reproducing information, is disposed on the hub 406 via a spacer 410 and is fixed by the clamper 411.

An operation of the conventional hydrodynamic bearing device having the above-explained structure will be described below. When the stator 408 is supplied with electric power, a rotating magnetic field is generated. Thus, a torque is provided to the rotor magnet 407, so that the hub 406, the disk 409, the spacer 410, the clamper 411, the shaft 401 and the flange 403 start to rotate. As a result of this rotation, a pumping pressure is generated in the dynamic pressure generating grooves 402E, 402F, 403A and 403B, which causes floatation of the shaft 401, so that the shaft 401 can rotate without contacting the thrust plate 404 and the inner face of the bearing bore 402A.

In addition, a flangeless shaft type hydrodynamic bearing device that has a shaft without a flange has started to be adapted so as to respect recent demands for smaller motors. In this type, a radial dimension can be reduced so that all of the shaft length in the axial direction can be used for the radial bearing. Therefore, a dimension in the axial direction can also be reduced (See, for example, Japanese Unexamined Patent Publication No. 58-24616, Japanese Unexamined Patent Publication No. 59-43216, Japanese Patent No. 2509752 and Japanese Unexamined Patent Publication No. 8331796).

Concerning the conventional hydrodynamic bearing device, there is a case where the rotation of the motor generates bubbles of air that enters the fluid when the device was assembled or that was not degassed completely. If lubricating fluid like the oil 412 contains air bubbles, its ability to support a load is lowered at the bubble portion, resulting in a drop in rotation accuracy or in lubricating ability or reduction in life.

In addition, if the air bubbles are expanded in the conventional hydrodynamic bearing device due to a low pressure environment during transportation by airplane or a high temperature environment, the lubricating fluid filling the gap between the shaft and the bearing bore may be squeezed out of the hydrodynamic bearing device resulting in a leakage. For this reason, the hydrodynamic bearing device may have a potential problem of decrease of lubricating fluid and contamination of the same depositing on other components.

In addition, the above-mentioned conventional hydrodynamic bearing device needs the lower retaining portion 402B for fixing the thrust plate 404 to the sleeve 402. The lower retaining portion 402B is formed on the sleeve 402 that is manufactured by a precision process at a high cost, as the dynamic pressure generating grooves 402E and 402F are formed. Accordingly, the sleeve 402 becomes an expensive component. If a defect such as a crack occurs when the lower retaining portion 402B is processed, the sleeve 402 is wasted resulting in a large loss.

In recent years, improved productivity of the hydrodynamic bearing device has been required so as to reduce costs. Furthermore a compact and low profile which incorporates the hydrodynamic bearing device is required as demand for the disk driving apparatus, such as a hard disk drive, increases.

In addition, the hydrodynamic bearing device of the flangeless shaft type has the following potential problems. First, although it is advantageous for small size when it is adopted for a spindle motor of an inner rotor type, there is no space for attaching a stopper inside a hub. Second, since the height is also reduced along with a smaller size, the capacity for keeping oil is limited. The oil keeping space has a trade off relationship with the radial bearing dimension. Therefore, when trying to secure sufficient bearing stiffness in the device of compact size, it is difficult to secure sufficient oil keeping space and avoid a decrease in device life. Third, since a dimension in the axial direction is also reduced along with a smaller size, it is difficult to secure sufficient space for coupling the thrust plate and a thin plate. Fourth, since air bubbles may be generated in the bearing space due to the smaller size, it is necessary to reliably remove air bubbles.

SUMMARY OF THE INVENTION

An object of the present invention is to provide a hydrodynamic bearing device that can realize smooth removal of air bubbles and prevent contamination in the device as well as provide a compact and low profile with good workability and high productivity at low cost a spindle motor and a hard disk driving apparatus that incorporate the hydrodynamic bearing device.

Still yet another object of the present invention is to solve the above-mentioned problems in a hydrodynamic bearing device of a flangeless shaft type.

According to a first aspect of the present invention, a hydrodynamic bearing device includes a sleeve having a bearing bore substantially at the center portion, a shaft inserted in the bearing bore in a rotatable manner, a thrust plate for supporting an end of the shaft in the thrust direction, and a cap portion having an opening portion through which the shaft passes and covering the upper surface of the sleeve. A radial hydrodynamic bearing is formed between the bearing bore of the sleeve and the shaft, while a thrust hydrodynamic bearing formed between the thrust plate and an end of the shaft. The shaft has a step portion with a reduced diameter in the vicinity of the upper surface of the sleeve, and the cap portion has the radially inner portion that covers the step portion. A first space is formed between the upper surface of the sleeve and the cap portion, and the first space has width in the axial direction that is small in the vicinity of the bearing bore and becomes larger toward the outer rim of the sleeve. A second space is formed between the cap portion and the step portion, and the second space has width in the axial direction that is small in the vicinity of the bearing bore and becomes larger toward the center of the shaft.

Since the cap portion covers the step portion of the shaft and the upper surface of the sleeve, and it works as a stopper of the shaft, a flange that was necessary in the conventional structure can be eliminated. Therefore, a small size and a low profile of a hydrodynamic bearing device can be realized. In addition, the cap portion ensures the first space to be the oil reservoir between itself and the upper surface of the sleeve. Therefore, oil keeping capacity of the device can be increased so that a life thereof can be improved.

Furthermore, even if the lubricating fluid such as oil in the hydrodynamic bearing device go out into the second space when the shaft rotates, the lubricating fluid can return into the hydrodynamic bearing device by capillary force because the second space has a width in the axial direction of the bearing bore reduced in the vicinity of the bearing bore in this invention. Thus, reducing quantity of the lubricating fluid and adhesion of oil as well as contamination to other components due to leak of the lubricating fluid to the outside of the hydrodynamic bearing device can be prevented.

Preferably, a distance between the bearing bore and the shaft of the hydrodynamic bearing device is smaller than the smallest width between the first space and the second space in the axial direction.

A distance between the bearing bore and the shaft at the vicinity of the bearing bore is smaller than the smallest width between the first space and the second space in the axial direction. Therefore, it is unlikely that the lubricating fluid enters the second space due to the capillary action. Thus, it is possible to prevent decrease of the lubricating fluid as well as contamination or adhesion to other components due to leakage of the lubricating fluid to the outside of the hydrodynamic bearing device.

A gap "a" is defined between the upper surface of the sleeve and an inner surface of the cap at the vicinity of the bearing bore in the axial direction, a gap "c" is defined between the shaft and the inner surface of the cap in the axial direction at the vicinity of the bearing bore, and a gap "e" is formed between the outer surface of the shaft and the inner surface of the bearing bore; and these gaps "a", "c" and "e" have following relation, a>c>e.

According to a second aspect of the present invention, a hydrodynamic bearing device includes a sleeve having a bearing bore substantially at the center portion, a shaft inserted in the bearing bore in a rotatable manner, a thrust plate for supporting an end of the shaft in the thrust direction, and a bracket including a cap portion having an opening portion through which the shaft passes and covering the upper surface of the sleeve, a side portion that is continuous from the cap portion and covers the side face of the sleeve, the and a lower retaining portion that is continuous from the side portion for retaining the thrust plate so as to make intimate contact with the sleeve. A radial hydrodynamic bearing is formed between the bearing bore of the sleeve and the shaft, while a thrust hydrodynamic bearing formed between the thrust plate and an end of the shaft. The shaft has a step portion with a reduced diameter in the vicinity of the upper surface of the sleeve, and the cap portion has the radially inner portion that covers the step portion. A first space is formed between the upper surface of the sleeve and the cap portion, and the first space has width in the axial direction that is small in the vicinity of the bearing bore and becomes larger toward the outer rim of the sleeve.

Since the cap portion covers the step portion of the shaft and the upper surface of the sleeve, and it works as a stopper of the shaft, a flange that was necessary in the conventional structure can be eliminated. Therefore, a small size and a low profile of a hydrodynamic bearing device can be realized. In addition, the cap portion ensures the first space to be the oil reservoir between itself and the upper surface of the sleeve. Therefore, oil keeping capacity of the device can be increased so that a life thereof can be improved.

The bracket has two functions of fixing the thrust plate and forming an oil reservoir. Therefore, the number of components can be reduced, a manufacturing process can be shortened, and productivity can be improved. Furthermore, since the bracket fixes the thrust plate and forms the oil reservoir in the first space, the cost can be reduced compared with the conventional structure in which the sleeve that is an expensive precision component is processed directly to form the lower retaining portion for fixing the thrust plate. In addition, even if a defect such as a crack occurs when the lower retaining portion is processed, the bracket can be a waste with little loss because it is not so expensive as the sleeve. Moreover, it is easy to replace the same, so an inexpensive hydrodynamic bearing device can be realized with high productively.

Preferably, a hydrodynamic bearing device has the lower retaining portion of the bracket and its thickness is smaller than a thickness of the side face portion.

Since a thickness of the lower retaining portion of the bracket is smaller than a thickness of the side portion, there is little possibility of distortion that may be generated in the side portion when the lower retaining portion is bent for retaining the thrust plate. Although the thickness of the lower retaining portion may change depending on a material, it is preferably set to a value within the range of ½ to ⅛ of a thickness of the side portion.

Preferably, the sleeve of the hydrodynamic bearing device is made of a sintered porous material, and bores of the sintered porous material are sealed by the bracket and the thrust plate covering outer surfaces of the sleeve. The sintered porous material is inexpensive, and a pattern of the dynamic pressure generating groove can be formed on the molding die in advance so that the dynamic pressure generating groove can be formed at the same time as modeling.

The bracket and the thrust plate cover the sleeve so as to seal the bores of the sintered porous material, so it is possible to prevent the lubricating fluid leak to the outside after moving in the continuous bores of the sintered porous material. For this reason, even if the sintered porous material is used for the sleeve member, the hydrodynamic bearing device does not lose the function of bearing. Thus, a hydrodynamic bearing device of high productivity can be realized at low cost.

A gap "a" is defined between the upper surface of the sleeve and an inner surface of the cap at the vicinity of the bearing bore in the axial direction, a gap "c" is defined between the shaft and the inner surface of the cap in the axial direction at the vicinity of the bearing bore, and a gap "e" is formed between the outer surface of the shaft and the inner surface of the bearing bore; and these gaps "a", "c" and "e" have following relation, a>c>e.

According to a third aspect of the present invention, a hydrodynamic bearing device includes a sleeve having a bearing bore substantially at the center portion, a column-shaped shaft inserted in the bearing bore in a rotatable manner, a thrust plate for supporting an end of the shaft in the thrust direction, and a cap portion having an opening portion through which the shaft passes and covers the upper surface of the sleeve. A radial hydrodynamic bearing is formed between the bearing bore of the sleeve and the shaft, while a thrust hydrodynamic bearing is formed between the thrust plate and an end of the shaft. An oil reservoir is provided between the upper surface of the sleeve and the cap portion. A circular groove is formed on the outer surface of the shaft.

Since a flangeless shaft type including the column-shaped shaft is adopted, the entire device can be a compact size. Furthermore, although the cap portion forms an oil reservoir at the upper surface of the sleeve, it is difficult to secure sufficient quantity of oil due to a compact size. However, since the circular groove is formed on the outer surface of the shaft in the present invention, an oil keeping capacity can be sufficient. As a result, a life of the device can be improved.

A hydrodynamic bearing device has the two dynamic pressure generating grooves that are formed on the inner surface of the sleeve and are arranged side by side in the axial direction, and the groove of the shaft is arranged between the two dynamic pressure generating grooves in the axial direction.

Since the groove of the shaft is arranged between the two dynamic pressure generating grooves of the sleeve, performance of the radial bearing is not affected.

Preferably, a hydrodynamic bearing device has a recess that is formed on the inner surface of the sleeve between the two dynamic pressure generating grooves in the axial direction, and the groove of the shaft has a dimension smaller than the recess of the sleeve in the axial direction.

Since the groove of the shaft is arranged so as to correspond to the recess of the sleeve, performance of the radial bearing is not affected.

Preferably, a hydrodynamic bearing device has a space formed between the inner circumferential surface of the cap portion and the outer circumferential surface of the shaft near the step portion, and the space has a radial gap that decreases toward the outside in the axial direction.

Even if the lubricating fluid such as oil in the hydrodynamic bearing device move into the space side when the shaft rotates, the lubricating fluid can return into the hydrodynamic bearing device by capillary force because the radial gap decreases toward the outside in the axial direction. Thus, reducing quantity of the lubricating fluid and adhesion of oil as well as contamination to other components due to leak of the lubricating fluid to the outside of the hydrodynamic bearing device can be prevented.

Preferably, a hydrodynamic bearing device has the inner circumferential surface of the cap portion that extends straight in the axial direction, and the outer circumferential surface near the step portion is a tapered surface whose diameter decreases toward the outside in the axial direction.

Preferably, a hydrodynamic bearing device includes the sleeve that is provided with a communication path through which the space in the vicinity of the thrust plate can communicate with the first space, and oil in the hydrodynamic bearing moves in the communication path.

Since the hydrodynamic bearing device is provided with the first space to be the oil reservoir and the communication path through which the first space can communicate with the space in the vicinity of the thrust plate, air bubbles contained in the oil can be removed smoothly so that performance deterioration of the hydrodynamic bearing device can be prevented.

Preferably, a hydrodynamic bearing device includes the cap portion that is provided with a ventilation path through which the first space can communicate with the outside.

When ambient temperature rises and inner pressure of the air bubbles increase, or when the inner pressure of the air bubbles becomes relatively large due to a lower pressure environment in transportation by airplane, the air bubble pressure in the first space and the external pressure can be balanced by the ventilation path so as to prevent the oil from leaking due to expansion of the air bubbles.

Preferably, a spindle motor includes the hydrodynamic bearing device described above.

It is possible to provide a hydrodynamic bearing device and a spindle motor having the hydrodynamic bearing device that can remove air bubbles smoothly, prevent contamination in the device, and have compact and low profile with good processability and high productively at low cost.

Preferably, a hard disk driving apparatus includes a spindle motor described above and a disk that is a record medium that is fixed to a hub of the spindle motor.

It is possible to provide a hydrodynamic bearing device and a hard disk driving apparatus that can remove air bubbles smoothly, prevent contamination in the device, and have compact and low profile with good processability and high productively at low cost.

According to this invention, the cap portion forms an oil reservoir and realizes a stopper for preventing the shaft from dropping out.

According to this invention, the first space is provided, so air bubbles can be removed smoothly, and contamination in the device can be prevented. Since the bracket has a function of fixing the thrust plate, it is not necessary to process a sleeve directly that is an expensive precision component. Therefore, the number of components can be reduced, a manufacturing process can be shortened, and productivity can be improved. Thus, a hydrodynamic bearing device, a spindle motor and a hard disk driving apparatus including the hydrodynamic bearing device that have compact and low profile with good processability can be provided at low cost.

BRIEF DESCRIPTION OF THE DRAWINGS

Referring now to the attached drawings which form a part of this original disclosure.

DESCRIPTION OF THE PREFERRED EMBODIMENTS

Figure 1:
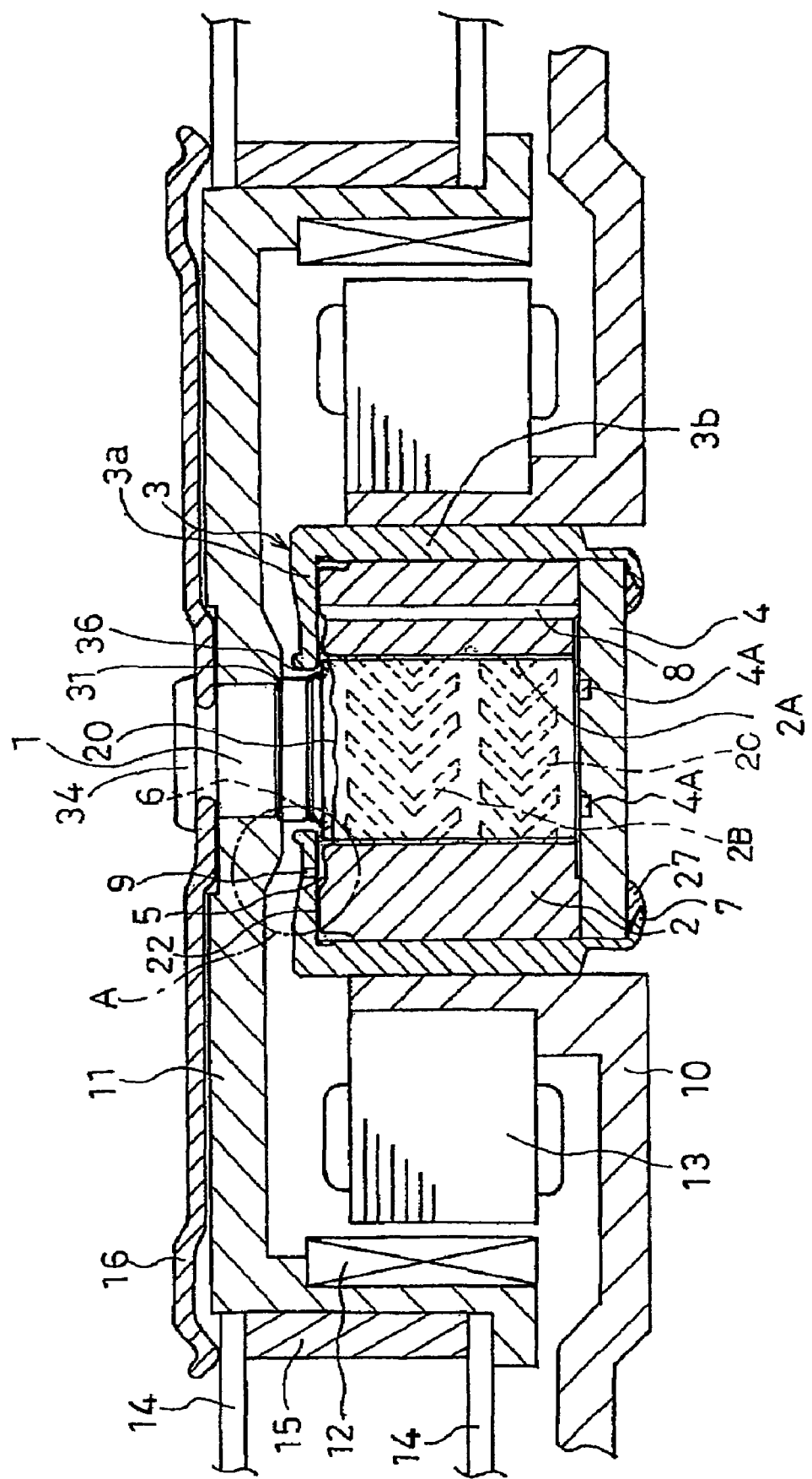
FIG. 1 is a cross sectional view of a hard disk driving apparatus including a spindle motor and a hydrodynamic bearing device according to a first embodiment of the present invention.

Selected embodiments of the present invention will be described with reference to FIGS. 1–8. Note that the following embodiments are just examples, and the present invention is not limited to these embodiments. In other words, it will be apparent to those skilled in the art from this disclosure that the following descriptions of the embodiments of the present invention are provided for illustration only and not for the purpose of limiting the invention as defined by the appended claims and their equivalents. In addition, in the following embodiments, overlapping description can be omitted by assigning the same reference numerals to the same elements.

First Embodiment

Figure 2:
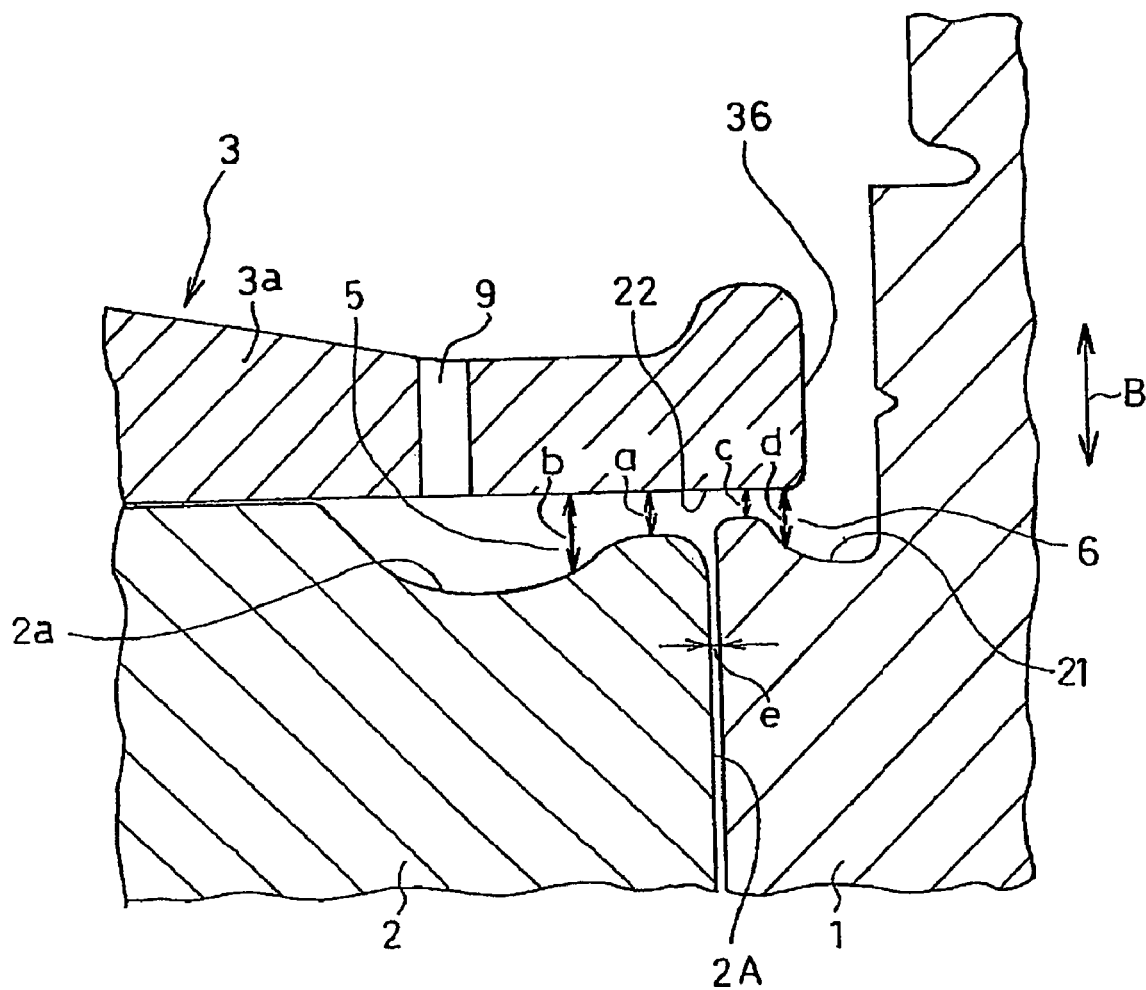
FIG. 2 is an enlarged cross sectional view of the portion A circled by the dashed dotted line in FIG. 1 according to the first embodiment of the present invention.

With reference to FIGS. 1 and 2, a hydrodynamic bearing device according to a first embodiment of the present invention will be described. The hydrodynamic bearing device of the present invention is especially useful as a spindle motor having a low cost and high reliability.

As shown in FIG. 1, a shaft 1 is provided with a hub 11 for retaining a rotor magnet 12. A base 10 is provided with a motor stator 13 that is disposed at a position opposed to the rotor magnet 12. In other words, this hydrodynamic bearing device adopts an outer rotor type spindle motor. A disk 14, which is a medium used for recording and/or reproducing information, is disposed on the hub 11 via a spacer 15 and is fixed by a clamper 16.

Referring to FIGS. 1 and 2, the shaft 1 is inserted in a bearing bore 2A of a sleeve 2 in a rotatable manner. The shaft 1 has a first step portion 21 with a reduced diameter at a vicinity of the upper face of the sleeve 2. The shaft 1 has a second step portion 31 with a diameter smaller than the first step portion 21 for fixing the hub 11. The hub 11 is fixed to the step portion 31 by press fitting and by adhesion. The clamper 16 is fixed to the hub 11 by screwing an external thread 34 into an internal thread (not shown) that is provided in the shaft 1. The sleeve 2 has a communicating hole 8 that connects a space at the vicinity of a thrust plate 4 to a first space 5. The thrust plate 4 is an element of a thrust bearing portion for retaining a lower end portion of the shaft 1 in the thrust direction.

A bracket 3 includes a ring-like upper retaining portion or cap portion 3a with an opening portion or inner circumferential surface 36 through which the shaft 1 passes, a relatively thick cylindrical side portion 3b extending from the upper retaining portion 3a and a cylindrical lower retaining portion 7 that extends from the side portion 3b and is thinner than the side portion 3b. A thickness of the lower retaining portion 7 is approximately one fifth of a thickness of the side portion 3b. When the sleeve 2 is inserted in the bracket 3, as shown in FIG. 1, the upper retaining portion 3a of the bracket 3 covers an upper end surface 2a of the sleeve 2 and the step portion 21 of the shaft 1. The side portion 3b covers a side face of the sleeve 2. Since an inner portion of the upper retaining portion 3a of the bracket 3 covers the step portion 21 of the shaft 1, the bracket 3 works as a stopper for preventing the shaft 1 from dropping out. The first space 5 is formed between the upper retaining portion 3a of the bracket 3 and a recess that is formed on the upper end surface 2a of the sleeve 2. The upper retaining portion 3a of the bracket 3 is provided with a ventilation hole 9. The ventilation hole 9 is a ventilation path for making the first space 5 communicate with the outside of the hydrodynamic bearing device so that pressure balance is ensured. A diameter of the ventilation hole 9 is set to an appropriate value, e.g., 0.5 mm or less, because the oil 20 may be scattered to the outside of the hydrodynamic bearing if it is too large. In addition, if the ventilation hole 9 and the communicating hole 8 are aligned on the same axis, the oil 20 may be scattered to the outside of the hydrodynamic bearing due to an impact or the like. Therefore, it is preferable to dispose the ventilation hole 9 and the communicating hole 8 at positions that are separated about 180 degrees from each other with respect to the shaft 1. Furthermore, there is a case in which the air bubbles are not removed externally but are accumulated in an oil reservoir and the ventilation hole 9 is not necessary.

The inner surface of the bearing bore 2A is provided with dynamic pressure generating grooves 2B and 2C having a herringbone shape that is known in the technology. A surface of the thrust plate 4 that is opposed to the shaft 1 is provided with a dynamic pressure generating groove 4A. As described above, this hydrodynamic bearing device is a flangeless shaft type including two radial dynamic pressure bearings and one thrust dynamic pressure bearing. In other words, the shaft 1 has a column-like shape without a flange.

Next, materials of components used in the first embodiment will be described. The shaft 1 is made of a stainless steel or similar steel. The sleeve 2 is made of a copper alloy. The entire surface of the sleeve 2 has nickel plating. The bracket 3 is made of a stainless steel with good machinability different than that of shaft 1 or a stainless steel with a good property for pressing. The thrust plate 4 is made of a stainless steel that can be hardened by a heat treatment. The base 10 is made of an iron containing metal with nickel plating on the surface. The hub 11 is made of a stainless steel with good machinability. The magnet 12 is a neodymium containing resin magnet. The stator core 13 is made of a silicon steel plate having a thickness within the range of 0.15–0.20 mm. The bracket 3 is also fixed to the base 10 by acrylic adhesive. The stator core 13 is also fixed to the base 10 by acrylic adhesive.

When the hydrodynamic bearing device of the first embodiment is assembled, the sleeve 2 and the shaft 1 are inserted first in the bracket 3. Then, the thrust plate 4 is placed on the sleeve 2. Next, the whole rim of the lower retaining portion 7 of the bracket 3 is bent inwardly so as to enclose the thrust plate 4. Then, adhesive 27 is applied to the bent lower retaining portion 7. Thus, the thrust plate 4 is fixed to the sleeve 2, and a gap of the bent lower retaining portion 7 is sealed so that the oil 20 filling the gap between the shaft 1 and the bearing bore 2A does not leak. The adhesive 27 is epoxy adhesive, for example.

The hydrodynamic bearing device of the first embodiment will be described more in detail with reference to FIG. 2. In FIG. 2, the reference letter "a" denotes a gap between the sleeve 2 and an inner surface 22 of the upper retaining portion 3a at the vicinity of the bearing bore 2A in the axial direction as shown in an arrow B (hereinafter referred to as a gap "a"). The reference letter "b" denotes a gap between the sleeve 2 and the inner surface 22 in the axial direction at a portion outward from the gap "a" position of the sleeve 2 (hereinafter referred to as a gap "b"). The reference letter "c" denotes a gap between the shaft 1 and the inner surface 22 in the axial direction at the vicinity of the bearing bore 2A (hereinafter referred to as a gap "c"). The reference letter "d" denotes a gap between the shaft 1 and the inner surface 22 in the axial direction at the portion closer to the center of the shaft 1 than the gap "c" position (hereinafter referred to as a gap "d"). The reference letter "e" denotes a gap between the outer surface of the shaft 1 and the inner surface of the bearing bore 2A (hereinafter referred to as a gap "e").

The first space 5 increases its width from the gap "a" toward the gap "b" at the vicinity of the bearing bore 2A. A second space 6 is formed between the inner surface 22 of the bracket 3 and the step portion 21 of the shaft 1. The second space 6 increases its width from the gap "c" toward gap "d" at the vicinity of the bearing bore 2A. The gap "c" is narrower than the gap "a". The gap "e" is narrower than the gap "a" and the gap "c".

In the first embodiment, the gap "a" is 40–100 microns, the gap "c" is 10–40 microns, and the gap "e" is 1–5 microns, for example. Normally, these gaps a, c and e have following relation, a>c>e An operation of the hydrodynamic bearing device of the first embodiment will be described below with reference to FIGS. 1 and 2. When the stator 13 is supplied with electric power, a rotating magnetic field is generated. Then, a torque is given to the rotor magnet 12 so that the hub 11, the disk 14, the spacer 15, the clamper 16 and the shaft 1 start rotating. As a result of the rotation, a pumping pressure is generated in the dynamic pressure generating grooves 2B, 2C and 4A, which causes floatation of the shaft 1 such that the shaft 1 rotates without contacting the thrust plate 4 or the inner surface of bearing bore 2A. When the shaft 1 rotates, the oil 20 filling the gap between the shaft 1 and the bearing bore 2A as well as the gap between the shaft 1 and the thrust plate 4 forms a radial hydrodynamic bearing portion between the shaft 1 and the bearing bore 2A, and also forms a thrust hydrodynamic bearing portion between the lower end portion of the shaft 1 and the thrust plate 4.

The following description is about ejecting air bubbles if they are contained in the oil 20. The radial dynamic pressure generating grooves 2B and 2C are designed to be a well-known shape so that the oil 20 moves from the upper portion to the lower portion in FIG. 1 by the pumping pressure generated in the radial hydrodynamic bearing portion. Therefore, the oil 20 circulates in the path including the radial hydrodynamic bearing portion, the communicating hole 8, the first space 5 and the radial hydrodynamic bearing portion. Air (air bubbles) contained in the oil 20 at the vicinity of the thrust hydrodynamic bearing portion, having diameters larger than the width of the gap "a" usually, moves in the communicating hole 8 together with the oil 20 from the lower portion to the upper portion so as to enter the first space 5. The first space 5 has a tapered shape that decreases its width from the gap "b" toward the gap "a" at the vicinity of the bearing bore 2A, so the oil 20 moves from the gap "b" to the vicinity of the gap "a" due to capillary action. Since the air bubbles contained in the oil 20 are not affected by the capillary action, the air bubbles are separated from the oil 20 to remain in the first space 5 and become an air mass. When the pressure of the first space becomes higher than the external pressure of the hydrodynamic bearing device, the air is ejected externally through the ventilation hole 9.

A function of the second space 6 will be described below. If an impulse is applied when the oil 20 enters the gap "e" due to the capillary action, the oil 20 may move rapidly to pass through the gap "c" and flow into the second space 6. If an impulse is applied externally when the oil 20 is stored in the second space 6, it is possible that the oil 20 will leak to the outside of the hydrodynamic bearing device. Since the hydrodynamic bearing device of the first embodiment has the gap "c" smaller than the gap "d", the oil 20 that flowed into the second space 6 flows from the gap "d" to the gap "c" due to the capillary action and enters into the gap "e". Thus, the leakage of the oil 20 through the gap between the opening portion 36 of the bracket 3 and the shaft 1 can be prevented. Therefore, a lessening function of the bearing due to a lack of oil as well as contamination or adhesion of oil to other components such as an outer hard disc or a head is prevented.

Since the bracket 3 works as a stopper for preventing the shaft 1 from dropping out, a flange that was necessary in the conventional structure can be eliminated. Therefore, a small size and a low profile of the hydrodynamic bearing device is realized. In addition, the upper retaining portion 3a secures the first space 5 as an oil reservoir between the upper retaining portion 3a and the upper surface 2a of the sleeve 2. Therefore, oil keeping capacity of the device is increased so that the life of the device is improved.

As described above, the hydrodynamic bearing device according to the first embodiment realizes smooth removal of air bubbles and prevention of contamination in the device. The bracket 3 has two functions: fixing the thrust plate 4 and forming the first space 5 (the oil reservoir). Accordingly the number of components is reduced, manufacturing steps are shortened, and productivity is improved. Since the thickness of the lower retaining portion 7 of the bracket 3 is thinner than the side portion 3b, there is little possibility of distortion of the side portion 3b due to bending the lower retaining portion 7 for retaining the thrust plate 4. Since the bracket 3 covers the step portion 21 of the shaft 1 and the upper portion of the sleeve 2, a more compact and low profile is realized. Since the bracket 3 fixes the thrust plate 4 and the first space 5 is provided with the oil reservoir, the device can be manufactured at lower cost than the conventional device in which the sleeve is processed directly as an expensive precision component. Even if a defect occurs in the manufacturing process of the lower retaining portion 7 as described above, the bracket 3 is wasted with little loss because it is not as expensive as the sleeve 2. Thus, it is possible to realize an inexpensive hydrodynamic bearing device with high productivity, a spindle motor and a hard disk driving apparatus having the hydrodynamic bearing device.

Second Embodiment

Figure 3:
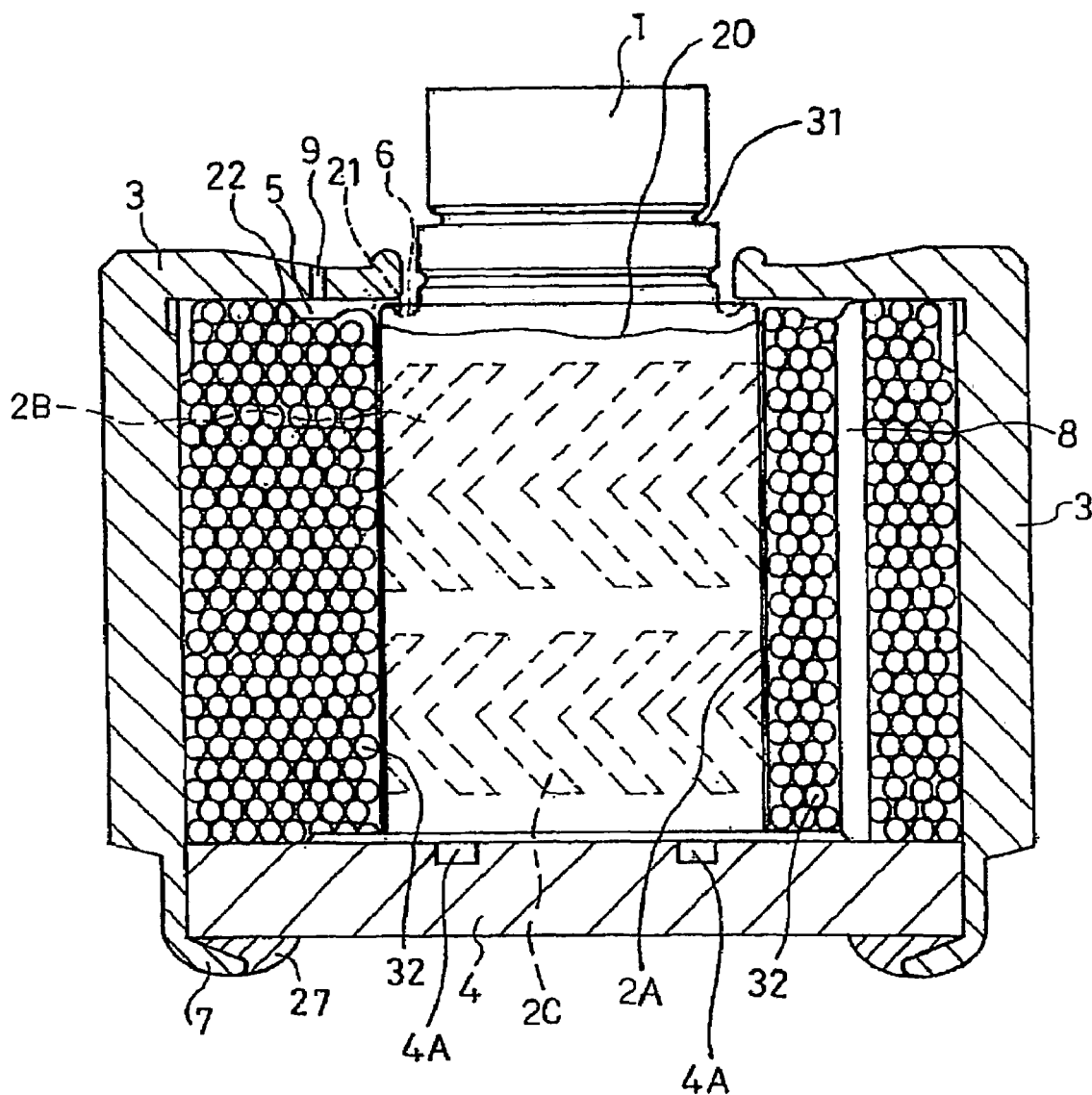
FIG. 3 is a cross sectional view of a hydrodynamic bearing device according to a second embodiment of the present invention.

A hydrodynamic bearing device of a second embodiment is shown in FIG. 3. In FIG. 3, a sleeve 32 made of a sintered porous material is used instead of the sleeve 2 of the first embodiment shown in FIG. 1. Other structures of this embodiment are the same as the first embodiment, so overlapping descriptions will be omitted. In the second embodiment, a grain size of the sintered porous material is approximately 0.1 mm in general. The structure of the sintered porous material in FIG. 3 is exaggerated for purposes of understanding.

The sleeve 32 is formed by molding raw materials such as various metal powder, metal compound powder or non-metal power, and sintering the same. The raw materials of the sintered porous material of the sleeve 32 include iron, an alloy of iron, copper, an alloy of copper, and a mixture of these. The sintered porous material that the dynamic pressure generating groove is preferably formed at the same time that the sleeve 32 is molded because patterns of the dynamic pressure generating groove are formed in the mold die in advance. It is also possible to make the dynamic pressure generating groove by a method of rolling after molding the shape of the sleeve 32.

Figure 9:
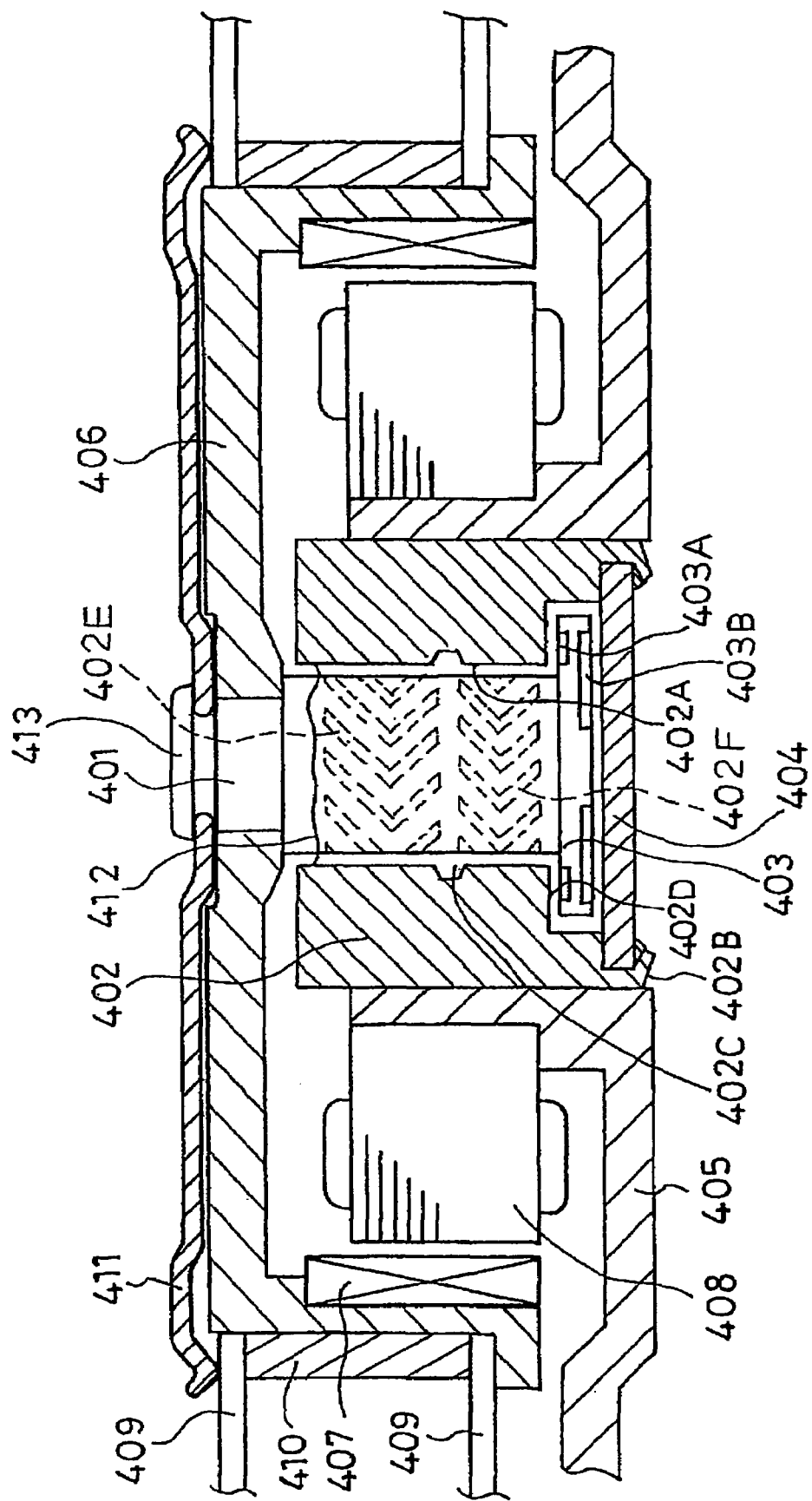
FIG. 9 is a cross sectional view of a conventional hard disk driving apparatus.

The sleeve 32 has continues bores, as shown in FIG. 3. The oil 20 may move through the continuous bores in the sleeve 32 when the shaft 1 rotates because of the sintered porous material of the sleeve 32. Therefore, in the case where the sleeve 32 is used with the conventional hydrodynamic bearing, the hydrodynamic bearing device may stop functioning as a bearing when the oil 20 goes out of the hydrodynamic bearing device. For this reason, the sleeve 32 made of the sintered porous material cannot be used with the conventional device of FIG. 9, hydrodynamic bearing device.

In the hydrodynamic bearing device of the second embodiment shown in FIG. 3, the bracket 3 and the thrust plate 4 seal the sleeve 32 made of the sintered porous material. Thus, it is possible to prevent the oil 20 from leaking out of the hydrodynamic bearing device after moving through the continuous bores of the sleeve 32. Therefore, the sintered porous material is used for the sleeve 32 without losing the function of a bearing in the hydrodynamic bearing device, such that a hydrodynamic bearing device with high productivity is realized at little cost.

Although the communicating hole 8 is formed in FIG. 3, the porous sintering body has continuous holes so that the communicating hole is not necessary in some cases.

Third Embodiment

Figure 4:
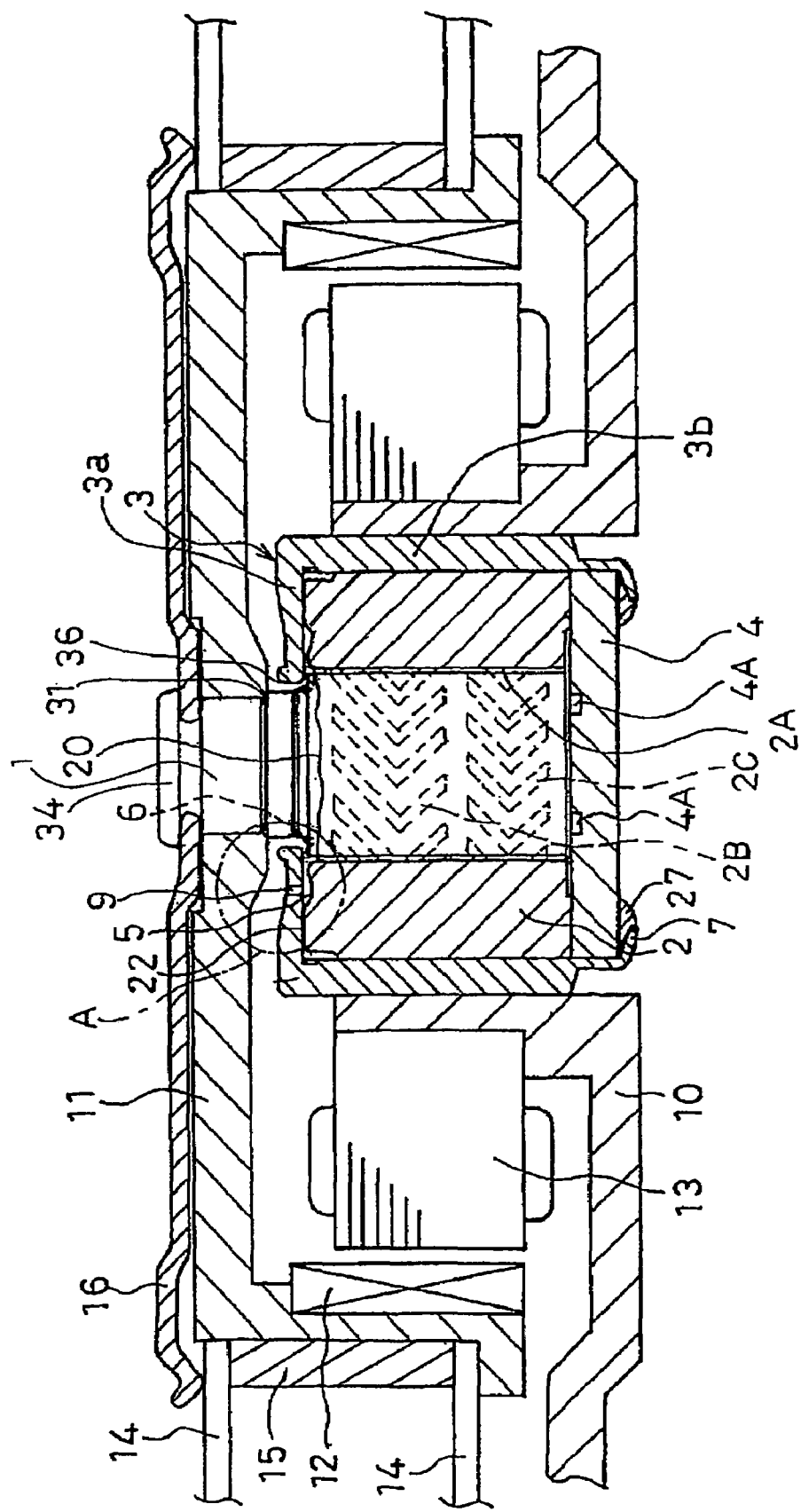
FIG. 4 is a cross sectional view of a hard disk driving apparatus according to a third embodiment of the present invention.

The hydrodynamic bearing device shown in FIG. 4 has the same structure as the device according to the first embodiment except for that the sleeve 2 is not provided with a communicating hole 8.

The actions and the effects of the bracket 3, the first space 5, the second space 6 and the ventilation hole 9 as well as synergistic effects of them are the same as the first embodiment.

Fourth Embodiment

A hydrodynamic bearing device according to a fourth embodiment of the present invention will be described with reference to FIGS. 5–8.

Figure 5:
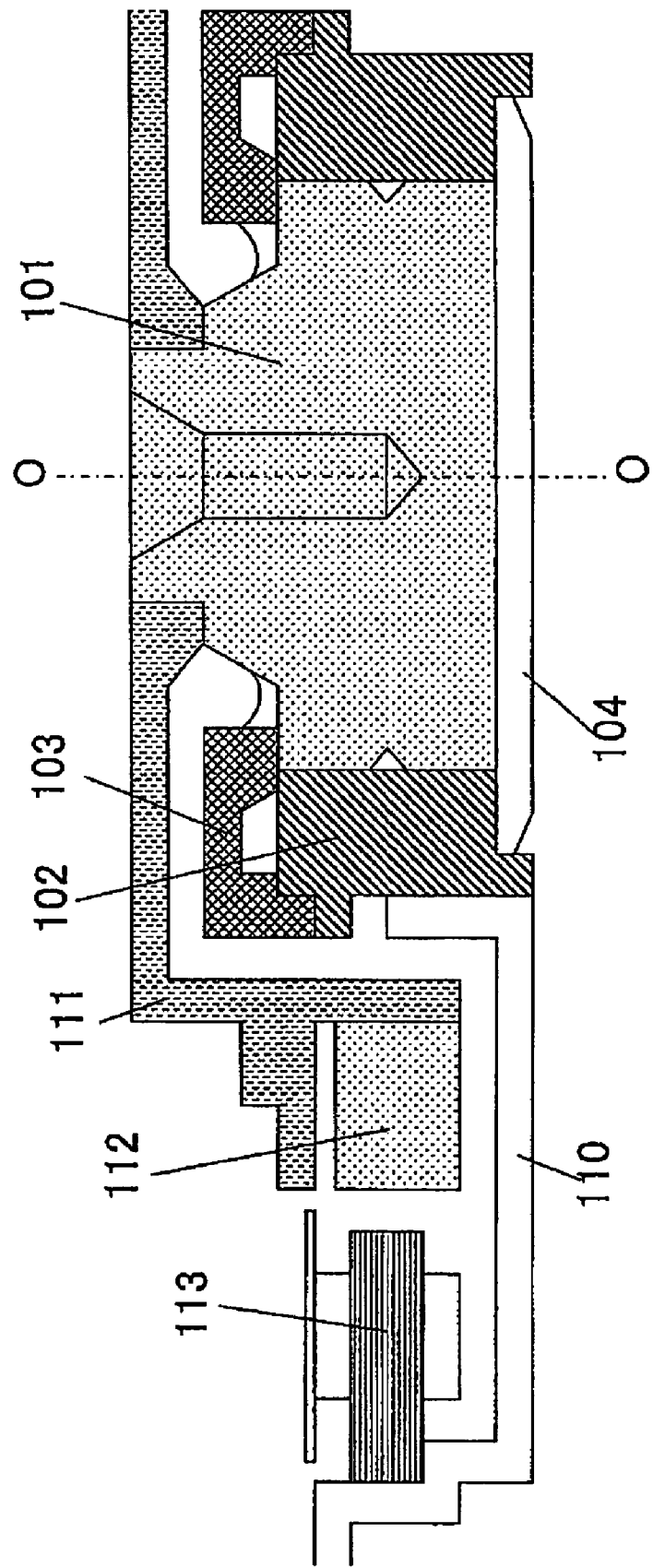
FIG. 5 is a cross sectional view of a hydrodynamic bearing device according to a fourth embodiment of the present invention.

As shown in FIG. 5, a shaft 101 is provided with a hub 111 for retaining a rotor magnet 112. A base 110 is provided with a motor stator 113 that is disposed at a position facing the rotor magnet 112. In other words, the hydrodynamic bearing device adopts an inner rotor type spindle motor.

Figure 6:
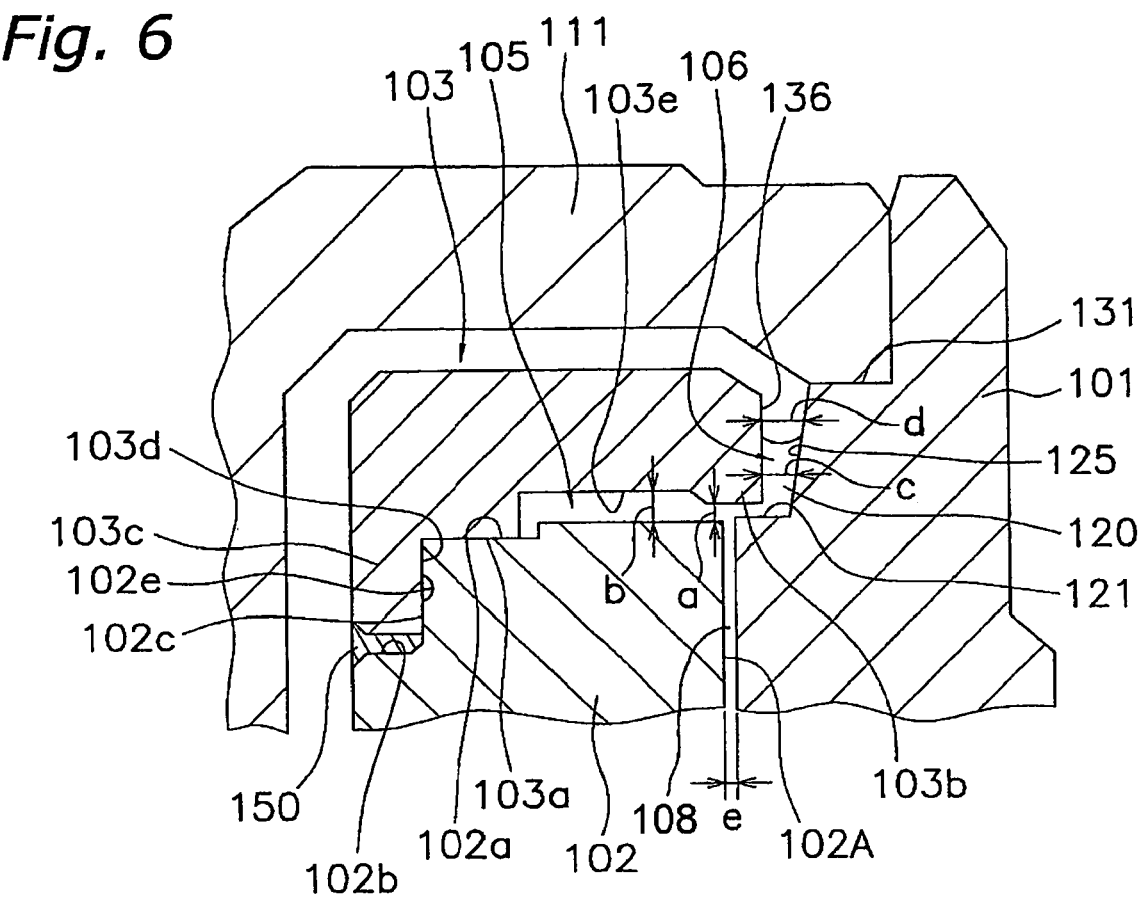
FIG. 6 is an enlarged partial cross sectional view of the hydrodynamic bearing device illustrated in FIG. 5.

As shown in FIG. 6, the shaft 101 is inserted in a bearing bore 102A of a sleeve 102 in a rotatable manner. The shaft 101 has a first shaft step portion 121 with a reduced diameter in the vicinity of an upper surface of the sleeve 102 and further has a second shaft step portion 131 with a diameter smaller than the first shaft step portion 121 so that the hub 111 can be attached thereto. The second shaft step portion 131 is inserted in the hub 111 by press fitting and is fixed thereto by adhesive. The sleeve 102 has a communicating hole 108 that is a communicating path through which a space in the vicinity of a thrust plate 104 can communicate with a first space 105. The thrust plate 104 is an element making up the thrust bearing portion for supporting a lower end portion of the shaft 101 in the thrust direction.

A cap 103 is a ring-shaped member having an opening or inner circumferential surface 136 through which the shaft 101 passes. The cap 103 is fixed to an upper surface 102a of the sleeve 102. The cap 103 covers the upper surface of the sleeve 102 and the first shaft step portion 121 of the shaft 101. More specifically, an inner portion of the cap 103 is positioned at the outside of the upper end surface 102a of the sleeve 102 in the axial direction. Furthermore an inner end portion of the cap 103 is positioned at the outside of the first shaft step portion 121 in the axial direction. Therefore, the inner circumferential surface 136 of the cap 103 is close to an outer circumferential surface 125 of the first shaft step portion 121. Since the above-mentioned cap 103 covers the first shaft step portion 121 of the shaft 101, the cap 103 has a function of a stopper for preventing the shaft 101 from dropping out. Thus, the structure for preventing the shaft 101 from dropping out is small because the cap 103 is used for the structure. The first space 105 is formed between the cap 103 and the upper end surface 102a of the sleeve 102. Preferably, the inner diameter of the cap is approximately 2.75 mm when the diameter of the shaft is approximately 3 mm, for example.

The inner surface of the bearing bore 102A is provided with dynamic pressure generating grooves 102B and 102C having a herringbone shape that are known in the technology. Furthermore, the inner surface of the bearing bore 102A is provided with a recess 102D for separating the grooves 102B and 102C. The surface of the thrust plate 104 is provided with a dynamic pressure generating groove 104A. As described above, this hydrodynamic bearing device is a flangeless shaft type including two radial dynamic pressure bearings and one thrust dynamic pressure bearing. In other words, the shaft 101 has a column-like shape without a flange.

A hydrodynamic bearing device in the first embodiment will be described in detail with reference to FIG. 6. In FIG. 6, "a" indicates a gap between the sleeve 102 and the lower surface of a ring protrusion 103b that is the most inner portion of the cap 103 in the axial direction in the vicinity of the bearing bore 102A (hereinafter referred to as a gap "a"). The reference sign "b" indicates a gap between the upper end surface 102a of the sleeve 102 located at a more outer side of the sleeve 102 than the location of the gap "a" and the lower surface 103e of the cap 103 in the axial direction (hereinafter referred to as a gap "b"). The reference sign "c" indicates a gap between the inner circumferential surface 136 of the cap 103 and the outer circumferential surface 125 of the shaft 101 in the radial direction in the vicinity of the bearing bore 102A (hereinafter referred to as a gap "c"). The reference sign "d" indicates a gap between the inner circumferential surface 136 of the cap 103 and the outer circumferential surface 125 of the shaft 101 in the radial direction (hereinafter referred to as a gap "d"). The gap "d" is located above the gap "c" in the axial direction. The reference sign "e" indicates a gap between the outer surface of the shaft 1 and the inner surface of the bearing bore 102A (hereinafter referred to as a gap "e").

The first space 105 is a space increasing from the gap "a" toward the gap "b" in the vicinity of the bearing bore 102A. This is because the inner surface of the cap 103 is provided with the ring protrusion 103b that extends downward in the axial direction and the protrusion 103b has a flat surface and a tapered surface at the outside of the flat surface. A second space 106 is formed between the inner circumferential surface 136 of the cap 103 and the outer circumferential surface 125 of the shaft 101. The second space 106 has a capillary seal structure that is realized by making the outer circumferential surface 125 of the shaft 101 a tapered surface. The second space 106 has a radial gap that increases toward an outside area in the axial direction. The inner circumferential surface 136 of the cap 103 extends straight in the axial direction. The outer circumferential surface 125 of the shaft 101 near the first shaft step portion 121 is a tapered surface with a diameter that decreases toward the outside area in the axial direction. The gap "e" between the sleeve 102 and the shaft 101 is smaller than any of the gaps "a"–"d".

Figure 7:
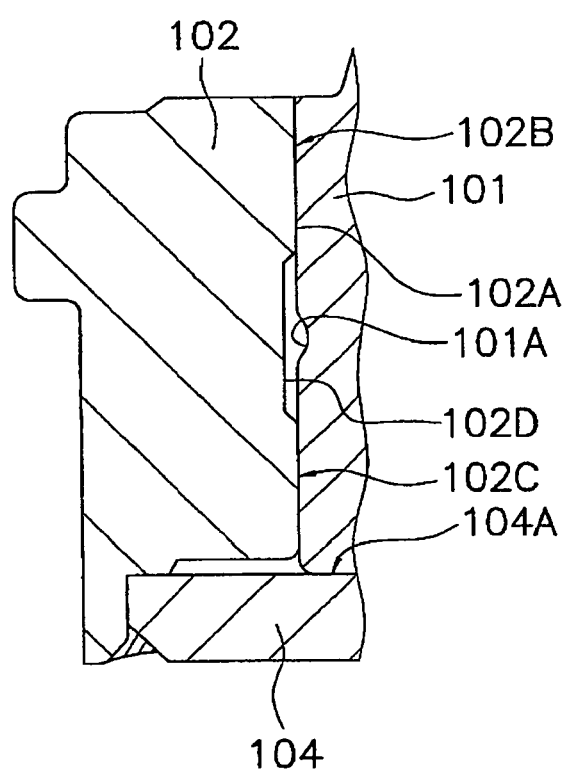
FIG. 7 is an enlarged partial cross sectional view of the hydrodynamic bearing device illustrated in FIG. 5.

A relationship between the shaft 101 and sleeve 102 will be described with reference to FIG. 7. The outer surface of the shaft 101 is not provided with a dynamic pressure bearing or the like but is provided with an annular groove 101A at the middle position in the axial direction. The groove 101A corresponds to the recess 102D that is formed on the inner surface of the bore 102A of the sleeve 102, and it is positioned at the middle point in the axial direction. Since the groove 101A is provided in this way, an oil keeping space becomes large so that more oil 120 can be kept. In particular, since the shaft does not have a flange in this embodiment, the size is substantially reduced compared with the conventional structure. As a result, a capacity of keeping the oil 120 is reduced. In addition, even if the oil reservoir consisting of the first space 105 is not sufficient along with a small size in the axial direction, the groove 101A substantially secures the oil keeping capacity. Therefore, the groove 101A has a large effect in this type of the hydrodynamic bearing device. In addition, the groove 101A also has a function as a chucking portion with which a part of the device is engaged for moving a component in the assembling process of the shaft 101. Preferably, the groove 101A of the shaft 101 has a width of approximately 0.25 mm and a depth of approximately 0.02 mm when a diameter of the shaft is approximately 3 mm, for example.

The cap 103 is fixed to the sleeve 102 by adhesive. More specifically, the lower surface 103a of the outer portion of the cap 103 abuts the outer portion of the upper end surface 102a of the sleeve 102 as shown in FIG. 6 at the left side, and a cylinder portion 103c provided at the outside of the cap 103 so as to extend in the axial direction is positioned at a step portion 102b that is provided to the outer portion of the sleeve 102. A gap is secured between the tip of the cylinder portion 103c and the step portion 102b, and adhesive 150 is filled in the gap. In this way, the structure with the gap filled with adhesive can compensate the difference between a coefficient of thermal expansion of the cap 103 and that of the sleeve 102 by elastic property of the adhesive. In addition, the inner surface of the cylinder portion 103c is fixed to the outer surface of the sleeve 102 by the adhesive. Here, the outer surface 102c of the sleeve 102 is provided with a circular groove 102e, which has a function as an adhesive reservoir. In other words, the cap 103 is glued to the sleeve 102 by two surfaces. Note that a dimension in the axial direction of the gap between the tip of the cylinder portion 103c and the step portion 102b is approximately 0.05 mm, and an epoxy adhesive is used as the adhesive.

Figure 8:
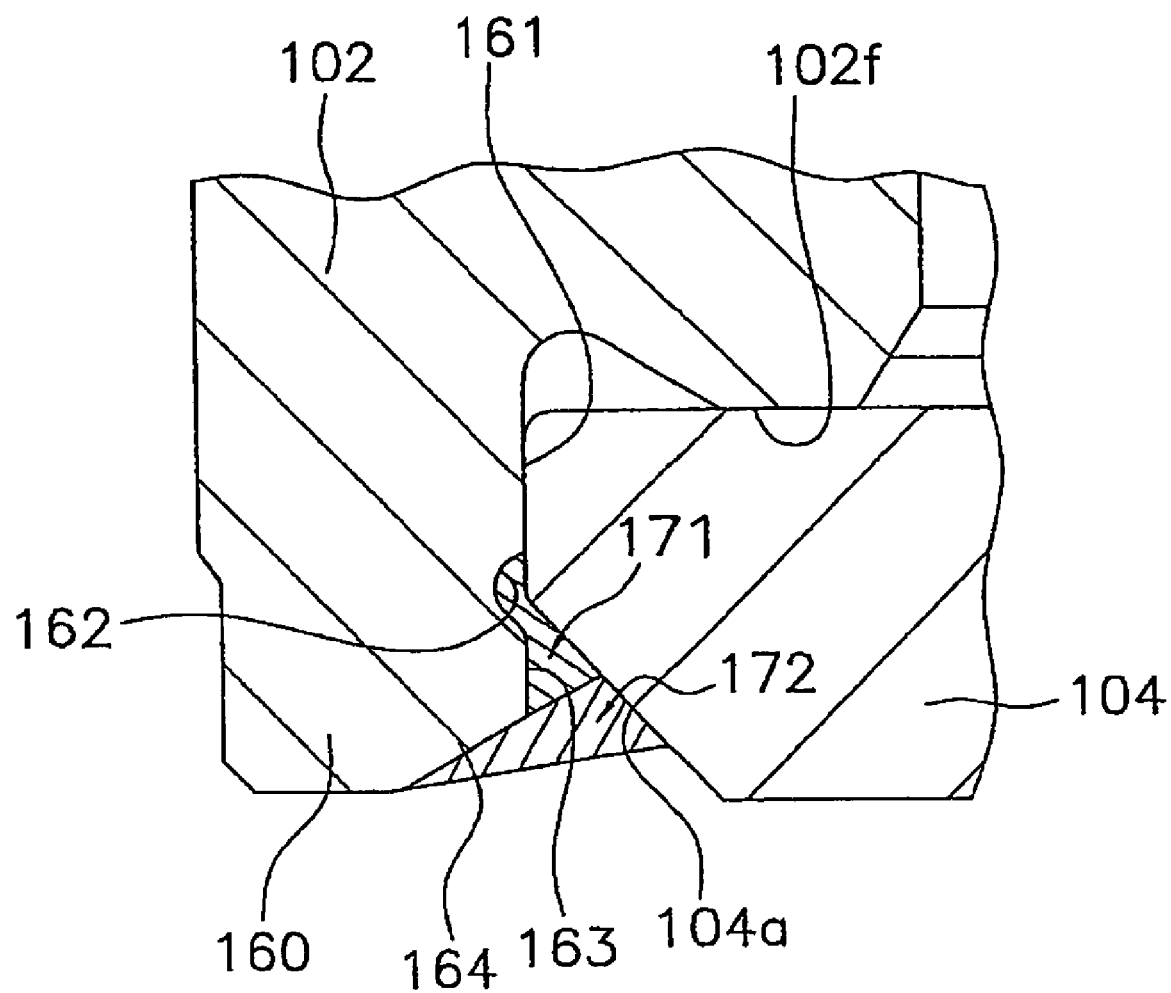
FIG. 8 is an enlarged partial cross sectional view of the hydrodynamic bearing device illustrated in FIG. 5.

The thrust plate 104 is fixed to the lower portion of the sleeve 102 by adhesive. More specifically, as shown in FIG. 8, the outer portion of the thrust plate 104 is positioned at a sleeve step portion 102f of the sleeve 102. The outer surface of the thrust plate 104 abuts an inner surface 161 of a cylinder portion 160 that constitutes the sleeve step portion 102f of the sleeve 102. The inner surface 161 of the cylinder portion 160 is provided with a circular groove 162, and the tip portion thereof is provided with a tapered surface 164 that becomes shallower in the axial direction toward the outside. A corner portion of the thrust plate 104 at the outside in the axial direction is provided with a tapered surface 104a that becomes deeper toward the outside. In other words, one edge of the thrust plate 104 is chamfered. The portion of the thrust plate 104 starting a tapered surface 104a corresponds to the groove 162 of the sleeve 102 so as to overlap the same. More specifically, the end portion of the tapered surface 104a in the axial direction is positioned in the groove 162 in the axial direction. The adhesive 171, 172 is filled in the groove 162 as well as between the tapered surfaces 164 and 104a. Concerning a method of adhesion, first, the thrust plate 104 is positioned at the sleeve step portion 102f of the sleeve 102. Then, the first adhesive 171 is supplied to the space between the cylinder portion 160 of the sleeve 102 and the outer surface of the thrust plate 104. The first adhesive 171 is filled in the groove 162 and further between the inner surface of the cylinder portion 160 and the tapered surface 104a. Finally, the second adhesive 172 is supplied between the tapered surface 164 of the sleeve 102 and the tapered surface 104a of the thrust plate 104. In this way, the shape is suitable for applying adhesive two times to glue the thrust plate 104 with sleeve 102, air sealing property is improved at the glued portion.

An operation of the hydrodynamic bearing device of this fourth embodiment will be described with reference to FIG. 5. When the stator 113 is supplied with power, a rotation magnetic field is generated and the rotor magnet 112 is given a torque so that the hub 111, a disk (not shown), a spacer, a clamper and the shaft 101 start to rotate. This rotation generates a pumping pressure in the dynamic pressure generating grooves 102B, 102C and 104A. As a result, the shaft 101 floats and rotates without contacting the thrust plate 104 and the inner surface of the bearing bore 102A. When the shaft 101 rotates, the oil 120 that is filled in the gap between the shaft 101 and the bearing bore 102A as well as in the gap between the shaft 101 and the thrust plate 104 forms a radial hydrodynamic bearing portion between the shaft 101 and the bearing bore 102A as well as a thrust hydrodynamic bearing portion between the lower end portion of the shaft 101 and the thrust plate 104.

A method of removing air bubbles if they are contained in the oil 120 will be described. The radial dynamic pressure generating grooves 102B and 102C are designed in a shape that is known well in which the oil 120 moves from the upper portion to the lower portion in FIG. 5 by the pumping pressure generated in the radial hydrodynamic bearing portion. Therefore, the oil 120 circulates in the path through the radial hydrodynamic bearing portion, the communicating hole 108 and the first space 105 back to the radial hydrodynamic bearing portion. Air (air bubbles) contained in the oil 120 in the vicinity of the thrust hydrodynamic bearing portion is usually larger than a width of the gap "a" and moves from the lower portion to the upper portion together with the oil 20 in the communicating hole 8 to enter the first space 105. Since the first space 105 is a tapered space that becomes narrower from the gap "b" toward the gap "a" in the vicinity of the bearing bore 102A, the oil 120 moves from the gap "b" to the vicinity of the gap "a" by capillary action. The air bubbles contained in the oil 120 are not affected by the capillary action. The air bubbles are separated from the oil 120 and remain in the first space to become a block air.

A function of the second space 106 will be described. When the oil 120 enters the gap "e" by capillary action, the oil 120 may move rapidly to pass through the gap "c" and enter the second space 106 if an impact shock is applied. If an external impact shock is applied in the state where the oil 120 remains in the second space 106, there is possibility that the oil 120 leaks to the outside of the hydrodynamic bearing device. Since the gap "c" is formed to be smaller than the gap "d" in the hydrodynamic bearing device of the fourth embodiment, the oil 120 that entered in the second space 106 flows from the gap "d" to the gap "c" by capillary action to enter into the gap "e". Thus, external leakage of the oil 120 from the gap between the opening portion 136 of the cap 103 and the shaft 101 can be prevented. Therefore, a malfunction of the bearing due to lack of the oil quantity as well as adhesion or contamination of the flowing oil to other components can be prevented.

As described above, according to the hydrodynamic bearing device of the first embodiment, smooth removal of air bubbles and prevention of contamination inside the device can be realized. Since the cap 103 has two functions of preventing the shaft 1 from dropping out and forming the first space 105 (oil reservoir), the number of components can be reduced, a manufacturing process can be shortened, and productivity can be improved. In particular, since the cap 103 prevents the shaft 1 from dropping out, a small size and a low profile can be realized compared with the conventional structure. Since the cap 103 enables the oil reservoir to be provided in the first space 5, the device can be manufactured at lower cost than the conventional one in which the sleeve is processed directly that is an expensive precision component. As a result, it is possible to realize an inexpensive hydrodynamic bearing device with high productively, a spindle motor and a hard disk driving apparatus having the hydrodynamic bearing device.

Note that the cap 103 is provided with a ventilation hole that is a ventilation path through which the first space 105 can communicate the outside of the hydrodynamic bearing device for balancing atmospheric pressure.

Although the dynamic pressure generating grooves are formed on the inner surface of the bearing bore and on the surface of the thrust plate facing the shaft in the embodiments of the present invention described above, they can be formed respectively on the outer surface of the shaft and the surface of the shaft facing the thrust plate. Similar effects can be obtained in any combination.

The present invention is useful for a hydrodynamic bearing device and a spindle motor as well as a driving apparatus of recording media having the hydrodynamic bearing device. The recording media includes an optical recording medium, a magneto optic recording medium and a magnetic recording medium. The media includes a tape other than the disk. In addition, the hydrodynamic bearing device can be used for a reel driving apparatus, a capstan driving apparatus and a drum driving apparatus other than the driving apparatus of recording media.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A hydrodynamic bearing device comprising:
 a sleeve having a bearing bore substantially at a center portion between the upper and lower surfaces;
 a shaft disposed in the bearing bore in a rotatable manner with the shaft having a step portion with a reduced diameter in a vicinity of the upper surface of the sleeve;
 a thrust plate supporting a first end of the shaft in a thrust direction; and
 a cap portion having an opening portion with the shaft disposed therein and covering the upper surface of the sleeve,
 the sleeve and the shaft being arranged to form a hydrodynamic bearing between the bearing bore of the sleeve and the shaft,
 the thrust plate and the shaft being arranged to form a hydrodynamic bearing between the thrust plate and the first end of the shaft,
 the sleeve and the cap portion being arranged to form a first space between the upper surface of the sleeve and the cap portion, the first space having a width in an axial direction of the shaft that increases from a vicinity of the bearing bore toward an outer rim of the sleeve, and
 the cap portion and the step portion of the shaft being arranged to form a second space formed between the cap portion and the step portion, the second space having a width in the axial direction that increases from a vicinity of the bearing bore toward a center of the shaft.

2. The hydrodynamic bearing device according to claim 1, wherein
the bearing bore and the shaft are spaced apart by a distance that is smaller in width in a radial direction than the widths of the first space and the second space.

3. The hydrodynamic bearing device according to claim 1, wherein
the sleeve includes a communication path connecting a space in a vicinity of the thrust plate with the first space such that oil moves in the communication path.

4. The hydrodynamic bearing device according to claim 1, wherein
the cap portion includes a ventilation path connecting the first space with an outside area.

5. The hydrodynamic bearing device according to claim 1, wherein a gap "a" is defined between the upper surface of the sleeve and an inner surface of the cap at the vicinity of the bearing bore in the axial direction, a gap "c" is defined between the shaft and the inner surface of the cap in the axial direction at the vicinity of the bearing bore, and a gap "e" is formed between the outer surface of the shaft and the inner surface of the bearing bore; and
these gaps "a", "c" and "e" have following relation, a>c>e.

6. A spindle motor including the hydrodynamic bearing device according to claim 1.

7. A hard disk driving apparatus including the spindle motor according to claim 6, and further comprising a disk that is a record medium fixed to a hub of the spindle motor.

8. A hydrodynamic bearing device comprising:
a sleeve having a bearing bore substantially at a center portion between the upper and lower surfaces;
a shaft disposed in the bearing bore in a rotatable manner with the shaft having a step portion with a reduced diameter in a vicinity of the upper surface of the sleeve;
a thrust plate supporting a first end of the shaft in a thrust direction; and
a bracket including a cap portion having an opening portion with the shaft disposed therein and covering the upper surface of the sleeve, a side portion that is continuous from the cap portion and covers a side face of the sleeve, and a lower retaining portion continuous with the side portion and retaining the thrust plate in contact with the sleeve,
the sleeve and the shaft being arranged to form a hydrodynamic bearing between the bearing bore of the sleeve and the shaft,
the thrust plate and the shaft being arranged to form a hydrodynamic bearing between the thrust plate and an end of the shaft,
the sleeve and the cap portion being arranged to form a first space between the upper surface of the sleeve and the cap portion, the first space having a width in an axial direction of the shaft that increases from a vicinity of the bearing bore toward an outer rim of the sleeve.

9. The hydrodynamic bearing device according to claim 8, wherein
the lower retaining portion of the bracket has a thickness that is smaller than a thickness of the side portion.

10. The hydrodynamic bearing device according to claim 8, wherein
the sleeve is made of a sintered porous material having bores that are sealed by the bracket and the thrust plate covering outer surfaces of the sleeve.

11. The hydrodynamic bearing device according to claim 8, wherein
the sleeve includes a communication path connecting a space in a vicinity of the thrust plate with the first space such that oil moves in the communication path.

12. The hydrodynamic bearing device according to claim 8, wherein
the cap portion includes a ventilation path connecting the first space with an outside area.

13. The hydrodynamic bearing device according to claim 8, wherein a gap "a" is defined between the upper surface of the sleeve and an inner surface of the cap at the vicinity of the bearing bore in the axial direction, a gap "c" is defined between the shaft and the inner surface of the cap in the axial direction at the vicinity of the bearing bore, and a gap "e" is formed between the outer surface of the shaft and the inner surface of the bearing bore; and
these gaps "a", "c" and "e" have following relation, a>c>e.

14. A spindle motor including the hydrodynamic bearing device according to claim 8.

15. A hard disk driving apparatus including the spindle motor according to claim 14, and further comprising a disk that is a record medium fixed to a hub of the spindle motor.

16. A hydrodynamic bearing device comprising:
a sleeve having a bearing bore substantially at a center portion between the upper and lower surfaces;
a column-shaped shaft disposed in the bearing bore in a rotatable manner with the shaft having an outer surface with an annular groove formed therein;
a thrust plate supporting a first end of the shaft in a thrust direction; and
a cap portion having an opening portion with the shaft disposed therein and covering an upper surface of the sleeve;
the sleeve and the shaft being arranged to form a hydrodynamic bearing between the bearing bore of the sleeve and the shaft,
the thrust plate and the shaft being arranged to form a hydrodynamic bearing between the thrust plate and an end of the shaft, and
the sleeve and the cap portion being arranged to form an oil reservoir disposed between the upper surface of the sleeve and the cap portion.

17. The hydrodynamic bearing device according to claim 16, wherein
two dynamic pressure generating grooves are arranged side by side in the axial direction on an inner surface of the sleeve, and
the annular groove of the shaft is arranged between the two dynamic pressure generating grooves in the axial direction.

18. The hydrodynamic bearing device according to claim 17, wherein
the inner surface of the sleeve has a recess disposed between the two dynamic pressure generating grooves in the axial direction, and
the annular groove has a dimension smaller than the recess in the axial direction.

19. The hydrodynamic bearing device according to claim 16, wherein
the cap portion has an inner circumferential surface and the shaft has an outer circumferential surface near a shaft step portion with a space being formed between the inner circumferential surface of the cap portion and the outer circumferential surface of the shaft near the shaft step portion, the space having a radial gap that increases toward an outside area in the axial direction.

20. The hydrodynamic bearing device according to claim 19, wherein the inner circumferential surface of the cap portion extends straight in the axial direction, and the outer circumferential surface of the shaft near the shaft step portion is a tapered surface with a diameter that decreases toward the outside area in the axial direction.

21. A spindle motor including the hydrodynamic bearing device according to claim 16.

22. A hard disk driving apparatus including the spindle motor according to claim 21, and further comprising a disk that is a record medium fixed to a hub of the spindle motor.

* * * * *